United States Patent Office 3,352,699
Patented Nov. 14, 1967

3,352,699
CALCIUM SILICATE BRICK DEVELOPMENT
John St. C. Wheeler, 1229 Mississauga Road N.,
Port Credit, Ontario, Canada
No Drawing. Filed Oct. 15, 1964, Ser. No. 404,155
14 Claims. (Cl. 106—89)

ABSTRACT OF THE DISCLOSURE

A sand-lime brick and a method for making the same which involves the use of sand, lime, Portland cement and coarsely crushed, hardened sand-lime material in the mix. The brick mix is formed into the shape of bricks without the use of high mechanical pressure and the so-formed modules are cured to form a hardened sand-lime brick product.

---

The present invention relates to an improved sand-lime building material and more particularly to a sand-lime brick and a process for making the same by which a brick having fine texture, high strength, high impact resistance and uniformity of size and colour is obtained without use of the time consuming mechanical high pressure techniques ordinarily attendant upon the manufacture of sand-lime bricks.

Heretofore, in the manufacture of fine sand-lime bricks, in order to obtain a brick of sufficient density and fineness of texture as well as with sufficient strength and high impact resistance to meet the A.S.T.M. C73–51 and C67–60 specifications for sand-lime products, it has been necessary to use lengthy tamping operations or to utilize brick making machines which exert pressures in the order of a number of tons per square inch to form the bricks. The slow and cumbersome procedure used in the manufacture of these bricks is a major factor in the high cost of sand-lime brick products.

Many attempts have been made to adopt the procedures used in the mass production of concrete blocks to speed up sand-lime brick production. In concrete block manufacture the blocks are formed into shape in the molds with little or no pressure being required in the forming operation. All previous attempts to adapt the mass production techniques of concrete block machinery to the production of sand-lime bricks have met with failure. Thus, all sand-lime bricks previously manufactured on concrete block machinery have failed to meet A.S.T.M. specifications in being not finely textured enough or dense enough and/or in not having the required strength, impact resistance or uniformity of size and shape.

The present invention provides a novel process for producing sand-lime brick products meeting A.S.T.M. specifications, while eliminating time consuming and expensive tamping or pressing operations, by which cement is utilized in the brick mix along with recycled and coarsely crushed hardened final product which acts to vastly improve the flow and packing characteristics of the wet mixture being added to the brick molds.

It is an object of the present invention to provide a high quality sand-lime brick product utilizing the mass production techniques of concrete block machinery.

It is also an object of the present invention to produce a finely textured, dense, sand-lime brick with high strength and high impact resistance without using the mechanical high pressure procedures heretofore required in forming sand-lime bricks before hardening.

Other objects and advantages of the invention will be apparent from the following description.

The present invention relates to a special sand-lime brick product manufactured by a novel process in which 10 to 15% by weight of water is added to the solid ingredients of the mix and intimately mixed therewith. The solid ingredients comprise, on a dry weight basis, 5 to 6.5% of calcium hydroxide, 2 to 5% of Portland cement, with the total of calcium hydroxide and cement being not less than 8.5%, 10 to 25% of recycled, coarsely crushed, hardened final product and the remainder finely ground siliceous material containing not less than 65% silica. Finely ground siliceous material, 100% passing a 150 mesh screen, should be present to make up 5 to 20% of the dry mix. The intimately mixed water and solid ingredients are measured into brick molds and the green bricks formed therefrom are then hardened in an autoclave to form a finely textured, high grade, sand-lime brick product.

Extensive experimentation leading up to the development of the present process for the production of sand-lime brick was based on the knowledge that concrete block mixes have smooth flow characteristics not present in standard sand-lime brick mixes and that, because of these smooth flow characteristics, concrete block machinery can be utilized in which the concrete block mix is merely measured into molds with no high pressure molding being necessary. This allows mass production techniques not attainable in sand-lime brick manufacture. At least part of the solution to the problem of improving the manufacture of sand-lime brick appeared to reside in developing a sand-lime brick mix which had smooth flow characteristics similar to that of concrete block mixes.

Smooth flow characteristics are imparted to the novel brick mixture of the present invention by recycling a portion of the hardened product or specially prepared hardened material in a relatively coarsely crushed state and intimately mixing this product portion or special material with the other solid ingredients and water before measuring into the brick molds. The resulting mix is formed into a densely packed state in the mold and the necessity of using high pressure tamping or pressing procedures is eliminated.

Replacement of a portion of the lime in the brick with Portland cement also appears to be a necessary procedure in order to obtain a dense and finely textured brick without having to use extreme pressures when molding the brick into shape. The presence of the cement in the brick seems to allow an initial cementing together of particles possibly from a tricalcium aluminate reaction, with the calcium silicate reaction later occurring to more completely cement the particles together in the brick.

Any reference to lime, as such, herein is meant to refer to slaked lime or calcium hydroxide and reference to bricks or brick products herein is meant to include all shapes and sizes of bricks, including brick blocks of a size comparable to ordinary concrete blocks.

The brick product of the present invention is manufactured by adding in the order of 10 to 15% by weight of water to the solid ingredients used in the mix and intimately mixing the whole before measuring the wet mix into the brick molds. It is most important that all ingredients be very intimately mixed in order to impart adequate smooth flow characteristics to the mix and in order to allow not only close packing of particles without the need of mechanical high pressure forming operations but also adequate cementing together of particles to provide sufficient strength in the hardened brick. It is to be noted that the 10 to 15% by weight of water includes any free water which is present with the solid ingredients.

The composition of the solid ingredients of the mix, calculated on a dry basis, comprises in the order of 5 to 6.5% calcium hydroxide, in the order of 2 to 5% of Portland cement, 10 to 25% of coarsely crushed, recycled final product and the remainder being ground siliceous material containing not less than 65% silica. The siliceous material should contain enough fines, ground to substantially completely pass a 150 mesh screen, to make up in the order of 5 to 20% of the dry, solid ingredients. The intimately mixed wet material is measured into brick molds where the bricks are shaped without any need for high pressure techniques usually attendant with sand-lime brick manufacture. The green bricks are then removed from the molds and heat hardened in the usual way in an autoclave under steam pressure.

The Portland cement is seen to replace a portion of the calcium hydroxide which is usually present in standard sand-lime brick mixes in amounts of the order of 10 to 12%. The total of the calcium hydroxide and the cement in the dry ingredients of the present brick mix should be not less than about 8.5%. The lime in the mix should be commercial grade calcium hydroxide or waste carbide residue, finely ground and having an available lime content of not less than 95%. Use of a lower grade lime material tends to depreciate the grade of the brick produced.

The recycled material is most advantageously obtained from rejects of hardened brick product which are coarsely crushed and fed back into the green brick mix. For standard sized bricks this recycled material should be crushed to substantially completely pass a ¼ inch by ¼ inch sieve in order to impart proper flow characteristics to the wet mix. With larger brick products a more coarsely crushed recycled material can be used. Thus, for a brick of the size of a standard concrete block, crushed, recycled material passing a ½ inch screen or even up to a ⅝ inch screen can be used.

Although recycled rejects are the best source of coarse material to be added to the mix, coarse material can, if desired, be specially prepared for the process. Thus, synthetic tobermorite can be compounded by mixing lime and silica in a mole ratio of 1 to 1 with water, forming the material in a briquetting or other shaping machine and hardening the shaped material in an autoclave regime with the resulting hardened calcium silicate being then crushed to the proper size for adding to the brick mix. The synthetic material is particularly useful in starting up brick production where no rejects are available. It is found that the crushed, recycled material, either synthetically made or recycled product, is very active and is useful not only in providing smooth flow characteristics for the brick mix but also for causing increased reactivity in the mix to provide a dense and more completely cured brick.

Any siliceous material can be used in the brick mix provided it contains not less than about 65% silica. Thus, sand, fly ash and ground siliceous slag are examples of materials which can be used. Use of a siliceous material containing less than 65% silica would result in an inferior brick product. Use of a higher grade silica material tends to improve the quality of the brick. The siliceous material should have an A.S.T.M. FM size of finer than 185 with an FM size of 215 being more advantageous. The finely ground siliceous material, making up in the order of 5 to 20% of the dry, solid ingredients and advantageously 100% passing 150 mesh, need not be specially added to the mix if enough is already present in the main siliceous material. It is found that a superior brick product is obtained, especially where insufficient finely divided silica is present in the main siliceous material added to the mix, if the 5 to 20% of fine silica, ground to 100% pass a 150 mesh screen is added to the brick mix in the form of a high grade silica material containing at least 98% silica. This finely divided, high grade material allows the production of an exceptionally well fused and strong sand-lime brick.

As aforementioned, the wet brick mix is measured into brick molds, without high pressure tamping or compression techniques usually attendant with the production of sand-lime bricks, and this can be accomplished on a mass production, standard concrete block machine. The so-formed, tightly packed green bricks are removed from the molds and are placed in an autoclave where they are hardened under steam pressure. Curing should be carried out for not less than about 8 hours at 150 pounds per square inch of steam, but curing may be carried out for longer periods of time under lower steam pressures. The result is a brick product which more than meets the A.S.T.M. C73-51 and C67-60 specifications for sand-lime products. The bricks produced have a very fine texture, high impact resistance, superior hardness, acid resistant properties superior to sand-lime bricks heretofore made in the art and very good uniformity of size and shape. The whiteness of colour obtainable with this brick, if white is desired, is of a very superior nature.

For the purpose of giving those skilled in the art a better understanding of the invention the following illustrative examples are given:

*Example I*

Dry components of a brick mix were provided analysing by weight 58.5% silica sand, containing 85% silica and with an A.S.T.M. FM size of 215, 6.5% commercial grade calcium hydroxide containing 95% available lime, 5% Type 1 Standard Portland cement, 15% of high grade silica material containing 98% available silica and ground to 100% pass a 150 mesh screen and 15% of recycled, hardened brick product crushed to 100% pass a ¼ inch by ¼ inch sieve. To the dry components was added 15% by weight of water and the whole was intimately mixed for five minutes in an Eirich Muller mixer. Green bricks were formed from this mix in a standard concrete block machine and the bricks so formed were hardened at 368° F. in an autoclave under steam pressure for 8 hours at 150 pounds per square inch steam. The brick product taken from the autoclave had superior whiteness of colour and easily met the A.S.T.M. specifications for sand-lime products. The bricks were harder than standard sand-lime bricks, with high impact resistance, and their acid resistance was superior to that of the standard sand-lime brick.

*Example II*

A brick mix of different composition to that described in Example I was prepared in a similar manner with the green bricks being formed and then hardened in the same way. The dry components of this mix consisted of 75% of the same silica sand, 5% of the same commercial grade calcium hydroxide, 5% of Portland cement, 5% of the same high grade silica ground to 100% pass a 150 mesh screen and 10% of recycled, hardened brick product, crushed to completely pass a ¼ inch sieve. The brick product obtained from this mix also had superior whiteness properties, with excellent strength, hardness and impact resistance and superior acid resistant properties. The properties of the brick were such as to come well within the A.S.T.M. C73-51 and C67-60 specifications for sand-lime products.

*Example III*

The test of Example II was repeated except that the Portland cement content of the dry components of the brick mix was reduced to 2%, and 8% of waste carbide residue was used rather than 5% commercial grade calcium hydroxide. The formed and autoclaved bricks were found to be satisfactorily within A.S.T.M. specifications.

*Example IV*

Another test was carried out similar to Example I but utilizing 25% of recycled, hardened brick product, crushed to pass a ¼ inch sieve, in the dry components, with the other dry components being used in the same proportions as in Example I. The intimately mixed materials were molded into green bricks which were autoclaved to form a satisfactory sand-lime brick product.

*Example V*

The test of Example II was repeated but using 70% of silica sand and 10% of clay brick (as a source of finely ground silica), ground to pass a 150 mesh screen. The brick product obtained was a superior sand-lime material with satisfactory standards.

*Example VI*

A further test was performed similar to Example I but utilizing 68.5% of silica sand and, as a source of fine silica, 5% of fly ash ground to pass a 250 mesh screen. The bricks obtained from this test came up to the A.S.T.M. requirements for sand-lime products.

It can be seen that by the process of the aforedescribed invention a superior sand-lime brick is produced by the mass production techniques of a standard cement block machine, with elimination of mechanical high pressure procedures in formation of the bricks.

What I claim as my invention is:

1. The method of making a high grade sand-lime brick, while eliminating the use of high mechanical pressures in forming the brick, which comprises forming an intimate mixture of 10 to 15% by weight of water and 85 to 90% by weight of dry ingredients comprising by weight 5 to 6.5% of calcium hydroxide, 2 to 5% of Portland cement, the total content of calcium hydroxide and cement being not less than 8.5%, 10 to 25% of recycled, hardened product in the form of crushed synthetic tobermorite compounded from a mixture of lime, silica and water, shaped and then hardened in an autoclave regime and crushed to a size of less than ¼ inch and the remainder crushed siliceous material with an FM sizing of finer than 185 containing not less than 65% silica, with in the order of 5% to 20% of the dry ingredients being siliceous material containing at least 98% silica ground to 100% pass a 150 mesh screen, forming the intimate mixture into the shape of bricks and curing the product so formed to obtain a hardened sand-lime brick of fine texture, high impact resistance, superior hardness and excellent acid resistance.

2. The method of making a high grade sand-lime brick as claimed in claim 1 wherein crushed siliceous material containing not less than 65% silica is added with the dry ingredients with an FM sizing of in the order of 215.

3. The method of making a high grade sand-lime brick as claimed in claim 1 wherein the siliceous material ground to 100% pass a 150 mesh screen is separately added to the dry ingredients.

4. The method of making a high grade sand-lime brick, while eliminating the use of high mechanical pressures in forming the brick, which comprises forming an intimate mixture of 10 to 15% by weight of water and 85 to 90% by weight of dry ingredients comprising by weight 5 to 6.5% of calcium hydroxide, 2 to 5% of Portland cement, the total content of calcium hydroxide and cement being not less than 8.5%, 10 to 25% of recycled, hardened sand-lime material crushed to a size of less than ⅝ inch and the remainder crushed siliceous material containing not less than 65% silica, with at least 5% of the dry ingredients being siliceous material ground to substantially completely pass a 150 mesh screen, forming the intimate mixture into the shape of bricks and curing the product so formed to obtain a hardened sand-lime brick.

5. The method of making a high grade sand-lime brick as claimed in claim 4 wherein recycled, hardened sand-lime material is added with the dry ingredients in the form of crushed synthetic tobermorite compounded from a mixture of lime, silica and water, shaped and then hardened in an autoclave regime and crushed to a size of less than ⅝ inch.

6. The method of making a high grade sand-lime brick as claimed in claim 4 wherein in the order of 5% to 20% of the dry ingredients is separately added in the form of siliceous material containing at least 98% silica and ground to 100% pass a 150 mesh screen.

7. The method of making a high grade sand-lime brick as claimed in claim 4 wherein crushed siliceous material containing not less than 65% silica is added with the dry ingredients with an FM sizing of finer than 185.

8. A brick product manufactured from a mixture of 10 to 15% by weight of water and 85 to 90% by weight of dry ingredients comprising by weight 5 to 6.5% of calcium hydroxide, 2 to 5% of Portland cement, the total content of calcium hydroxide and cement being not less than 8.5%, 10 to 25% of recycled, hardened product in the form of synthetic tobermorite compounded from a mixture of lime, silica and water, shaped and then hardened in an autoclave regime and crushed to a size of less than ¼ inch and the remainder crushed siliceous material with an FM sizing of finer than 185 containing not less than 65% silica, with in the order of 5% to 20% of the dry ingredients being ground siliceous material containing at least 98% available silica and ground to 100% pass a 150 mesh screen, the mixture being shaped and cured to form a hardened brick product of fine texture, high impact resistance, superior hardness and excellent acid resistance.

9. A brick product as claimed in claim 8 wherein the crushed siliceous material containing not less than 65% silica has an FM sizing of in the order of 215.

10. A brick product as claimed in claim 8 wherein the siliceous material ground to 100% pass a 150 mesh screen is a separate addition to the dry ingredients.

11. A brick product manufactured from a mixture of 10 to 15% by weight of water and 85 to 90% by weight of dry ingredients comprising by weight 5 to 6.5% of calcium hydroxide, 2 to 5% of Portland cement, the total content of calcium hydroxide and cement being not less than 8.5%, 10 to 25% of recycled, hardened sand-lime material crushed to a size of less than ⅝ inch and the remainder crushed siliceous material containing not less than 65% silica, with at least 5% of the dry ingredients being siliceous material ground to substantially completely pass a 150 mesh screen, the mixture being shaped and then cured to form a hardened brick product.

12. A brick product as claimed in claim 11 wherein the recycled, hardened sand-lime material is crushed synthetic tobermorite compounded from a mixture of lime, silica and water, shaped and then hardened in an autoclave regime and crushed to a size of less than ⅝ inch.

13. A brick product as claimed in claim 11 wherein in the order of 5% to 20% of the dry ingredients is a separate addition in the form of siliceous material containing at least 98% silica and ground to 100% pass a 150 mesh screen.

14. A brick product as claimed in claim 11 wherein the crushed siliceous material containing not less than 65% silica has an FM sizing of finer than 185.

References Cited

UNITED STATES PATENTS

| | | | |
|---|---|---|---|
| 2,421,721 | 6/1947 | Smith et al. | 106—120 |
| 2,803,556 | 8/1957 | Carlsson et al. | 106—120 |
| 2,875,075 | 2/1959 | Kalousek | 106—120 |
| 2,880,101 | 3/1959 | Ulfstedt | 106—120 |
| 2,898,220 | 8/1959 | Ulfstedt et al. | 106—120 |
| 3,001,882 | 9/1961 | Taylor | 106—120 |
| 3,042,536 | 7/1962 | Bishop | 106—120 |
| 3,100,156 | 8/1963 | Kalousek et al. | 106—120 |
| 3,116,158 | 12/1963 | Taylor | 106—120 |
| 3,192,060 | 6/1965 | Tilsen | 106—120 |
| 3,232,777 | 2/1966 | Bush | 106—119 |

TOBIAS E. LEVOW, *Primary Examiner.*

S. E. MOTT, *Assistant Examiner.*